US005399405A

United States Patent [19]

Rennels, Jr. et al.

[11] Patent Number: 5,399,405

[45] Date of Patent: Mar. 21, 1995

[54] TRUNK SECURITY SEAL

[75] Inventors: David M. Rennels, Jr., Stow; Ralph J. Madonia, Kent, both of Ohio

[73] Assignee: Morgan Adhesives Company, Stow, Ohio

[21] Appl. No.: 85,328

[22] Filed: Jun. 14, 1993

[51] Int. Cl.[6] ........................... B32B 3/06; B32B 3/10

[52] U.S. Cl. ........................................ 428/43; 428/194; 428/916; 283/103

[58] Field of Search ................. 428/43, 194, 343, 195, 428/916; 283/72, 103, 74

[56] References Cited

U.S. PATENT DOCUMENTS

| | | | |
|---|---|---|---|
| 1,006,087 | 10/1911 | Hertzberg | 428/43 |
| 2,254,936 | 9/1941 | Dick | 206/56 |
| 2,764,501 | 9/1956 | Perri | 428/343 |
| 3,854,581 | 12/1974 | Jones, Jr. | 206/460 |
| 4,432,462 | 2/1984 | Newkirk | 215/365 |
| 4,468,811 | 8/1984 | Shaw | 383/5 |
| 4,555,037 | 11/1985 | Rhees | 215/232 |
| 4,679,693 | 7/1987 | Forman | 206/610 |
| 4,771,891 | 9/1988 | Sorensen et al. | 283/103 |
| 4,941,196 | 7/1990 | Edelman | 383/5 |
| 4,944,603 | 7/1990 | Cornish | 383/5 |
| 4,961,503 | 10/1990 | Bell | 206/627 |
| 5,046,621 | 9/1991 | Bell | 206/627 |
| 5,141,180 | 8/1992 | Plaessman | 229/102 |

*Primary Examiner*—Alexander S. Thomas
*Attorney, Agent, or Firm*—Oldham, Oldham & Wilson Co.

[57] ABSTRACT

A tamper-evident seal for application to interior surfaces of motor vehicle hoods, trunks and other portals, the seal formed as an elongate strip of stock material having a band of pressure sensitive adhesive (PSA) affixed to a side of the strip near each end thereof; and transverse perforations between the bands of PSA. When the hood or trunk is opened, the perforation or weakened area will tear, before the PSA detaches from the inside trunk surface where it is adhered.

7 Claims, 2 Drawing Sheets

TRUNK SECURITY SEAL

FIELD OF THE INVENTION

The subject invention relates to a tamper-evident seal for safes, boxes, suitcases, doors, lids, trunks, openings, or the like. More particularly, the device is a strip of material adapted to seal across an opening, such that when the seal is broken it is evident that the enclosure has been opened.

BACKGROUND OF THE INVENTION AND PRIOR ART

The need for a tamper evident means on the doors, hoods and trunk lids of motor vehicles results from the fact that expensive components stored therein are sometimes found missing when the vehicle is delivered to the dealership. The problem attendant to preventive measures is pinpointing the stage of assembly or delivery when the tampering occurred.

The institution of controls for prevention involves frequent, repetitive inspections with concomitant delay and expense. Mechanical inspection devices are limited since vehicle deck lids and doors are normally closed and the removal of components like sound systems, spare tires or engine components is not readily discernable upon reclosure thereof.

Various devices have heretofore been developed to solve the problem. U.S. Pat. No. 1,006,087 to Hertzberg (Oct. 1911) discloses a shaving cup with a tamper-evident seal. There is a sealing strip for positioning around the cup at the junction of the cup and the cover. This sealing strip has an adhesive on it, adhering the strip to the cup and cover. Until the strip is broken, the shaving cup cannot be opened. Indicia printed on the strip indicate whether the seal has been broken. This patent shows the long-felt need for tamper-resistant seals.

U.S. Pat. No. 2,254,936 to Dick (Sept. 1941) discloses a package for containing and dispensing a fluid, in this case, a brake fluid. The package has a band 7 that has a tab 8 for aiding in tearing off the band.

U.S. Pat. No. 3,854,581 to Jones, Jr. (Dec. 1974) discloses the use of a pressure sensitive adhesive, (PSA), with a polymeric supporting material to provide a tamper-evident seal. The preferred support material is a polyolefin, particularly a polypropylene that is foamed and stretched so that it is uniaxially oriented to be weaker in the longitudinal direction.

U.S. Pat. No. 4,432,462 to Newkirk (Feb. 1984) discloses a completely different method of evidencing tampering. The tampering indicator has a fluid-filled reservoir and a chemical indicator strip, used with a receptacle having a cap Although the reservoir and the indicator strip are in communication with each other, the path is blocked until the cap is removed from the receptacle, the path is unblocked and the fluid can reach the indicator strip, where it causes a reaction to occur, showing the characteristic color that indicates tampering has occurred.

U.S. Pat. No. 4,468,811 to Shaw (Aug. 1984) discloses a tamper-evident closure for a bag. The closure consists of opposed webs 12 and 14. One of the webs has a flap 26 that has a pressure sensitive adhesive, (PSA), on it so that the flap can be sealed onto the other web as well as itself when it is folded over. The flap also has a transverse perforation or weakening 30 so that it will rupture before the PSA adhering to each of the respective webs does.

U.S. Pat. No. 4,555,037 to Rhees (Nov. 1985) discloses a tamper-evident inner seal for a container having a circular opening. The seal material is adhered around the circumference of the opening, and a circular pattern of perforations 48 around the inner pórtion of the seal provides a weakened point for opening the seal.

U.S. Pat. No. 4,679,693 to Forman (July 1987) discloses a resealable label for a container that uses a PSA on the label as well as a perforated or scored area.

U.S. Pat. No. 4,941,196 to Edelman (July 1990) discloses a closure flap for a bag that readily exhibits tampering with the flap after sealing. If the seal has been tampered with, a printed security pattern becomes visible through the clear seal, which is another method of demonstrating tampering.

U.S. Pat. No. 4,944,603 to Cornish (July 1990) discloses a resealable package with an encompassing tamper-evident band. This band 20 extends across an opening 18 in the package, as shown in FIG. 1, so that the opening cannot be opened without disrupting the band. The band has a transverse perforation or weakening 23, and the band is adhered to the package on either side of the opening by adhesive spot bonds 21. The claim requires at least lines of perforation (See Column 4, Line 64).

U.S. Pat. No. 4,961,503 (Oct. 1990) and U.S. Pat. No. 5,046,621 (Sept. 1991), both to Bell, disclose a tamper-evident notched sealing bag. The novelty appears to be a very strong PSA that will crinkle the flap if someone attempts to open the flap.

U.S. Pat. No. 5,141,150 to Plaessmann (Aug. 1992) discloses a pouring spout having a tamper-evident covering label thereon. The covering label 22 is a frangible sheet having an adhesive portion 24 and an adhesive-free portion 30. A perforation 34 divides the label into upper and lower portions. When the adhesive-free portion is grasped, the perforation tears, exposing the spout, which may then be opened. Since the adhesive portions occur on each side of the transverse perforation and the perforation will preferentially tear rather than have the adhesive yield.

None of the foregoing devices have application for preventing tampering with motor vehicles from the first stage of assembly line construction to dealer's acceptance. There is, therefore, a need for a tamper-evident security seal which would efficiently provide immediate, ostensible evidence of tampering.

OBJECTS AND SUMMARY OF THE INVENTION

Thus it is an object of the invention to provide a seal across an opening such that breakage is immanent upon breach of the opening.

A further objective is arrangement of the seal such that its ends are adhered to internal portions of the opening, thereby preventing access and attempts at corruption of the seal.

Another object of the invention is providing a seal which includes a constant visual means for monitoring its integrity, so that any tampering will be immediately detected.

Yet another object is the application of a pressure sensitive adhesive, (PSA), near each end of the seal and providing a weakened area or perforation near a middle portion of the seal, such that the weakened portion or perforation will fail before the PSA dislodges.

These and other objects of the invention are accomplished by providing an elongate strip of stock material, preferably paper having two ends and two sides, and a pressure sensitive adhesive, (PSA), applied to a side of the strip near each end thereof. The PSA may comprise a band which is affixed to a side of the strip near each end thereof. Between the bands of PSA, there is at least one transverse weakening or perforation of the strip,-weakened portion having less tensile strength than adhesive strength of the pressure sensitive adhesive, whereby the weakened portion is adapted to fail before the pressure sensitive adhesive. The weakening or perforation will preferentially breaks before the PSA dislodges.

The device is useful for sealing a door or opening, such as the trunk of a vehicle. When the trunk is opened, the perforation or weakened area will tear, rather than allowing the PSA to detach from the inside trunk surface, where it is adhered. This allows one to determine if the trunk has been opened. More general applications of this invention probably exist beyond the disclosed purpose of providing a tamper-evident seal for an automobile trunk. For example, a tamper-evident seal could be provided for a variety of portals, including, without limitation, safes, boxes, suitcases, doors (particularly at crime scenes and the like), lids, pill containers, etc.

DETAILED DESCRIPTION OF THE PREFERRED EMBODIMENT

Figure 1:
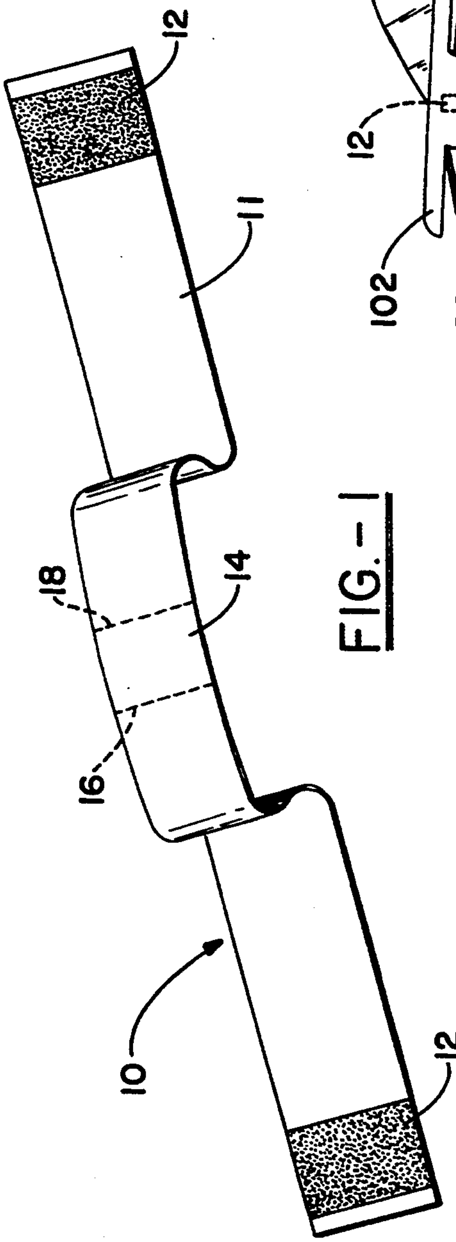
FIG. 1 is a perspective view of the tamper-evident security seal of the present invention with PSA applications at each end and weakened portion near the middle.

Referring to the drawings, a security seal for openings 10 comprises an elongated strip 11 of stock material, preferably paper, with a pressure sensitive adhesive (PSA) 12 disposed on one of the sides of the strip near each of the two ends thereof. FIG. 1 indicates the adhesive may be applied to areas of the strip near the strip ends. Alternatively, bands of PSA may be affixed to the strip 11 near each of the ends.

Figure 2:
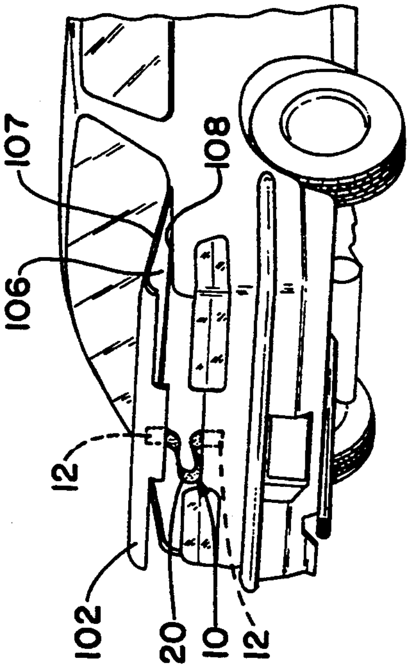
FIG. 2 is a side elevation of a motor vehicle with the tamper-evident security seal in operative arrangement interconnecting sides of an open trunk lid of a motor vehicle with the seal ends adhered to interior sides of the opening and middle portion of the extending exteriorly of the trunk space enabling visual confirmation of seal integrity.

The pressure sensitive adhesive means applied near ends of the strip permits the strip ends to be adhered on the inner surfaces of each side of an opening 106 as can be seen in FIG. 2. It will be understood that the positioning the strip inside a trunk lid 102, for example, can be achieved by simple application of the PSA portion of the strip against inner surfaces on each side of the closure. That means for securing having been established by manual pressure on the PSA, the security seal 10 in the form described essentially interconnects the sides of the opening 107,108 in FIG. 2. The strip 11 is purposely positioned on the interior surfaces to prevent access to the ends thereof secured by the PSA. The length of the strip determines the degree to which the trunk lid, hood, or door can be opened without damaging the seal.

The strip 11 preferably includes a weakened portion 14 formed transversely across the seal. The transverse weakened portion provides a means for weakening the middle portion of the strip, such that seal will break upon breach of the opening 106. Of course, the weakened portion of the strip and the resultant tensile strength of the strip is designed in conjunction with choice of PSA used and tensile strength of the PSA-interior opening surface bond. The weakened portion may be formed by one or more perforations 16,18 transversely across a width of the strip 11. The purpose is to effect a PSA having greater tensile strength than the tensile strength of the weakened portion near the middle of the strip. The result is that when the trunk, hood, door or lid is opened, the weakened area will tear, rather than the stronger bonded PSA detaching from the inside closure surface where it is adhered.

The PSA most suitable for the purpose would consist of a thin 0.0005 mil polyester film coated on both sides with a heavy coating of an aggressive high performance rubber based pressure sensitive adhesive. Product number XD-2793 supplied by Morgan Adhesives of Stow, Ohio, consists of the same characteristics. XD-2793 was designed for more demanding bonding applications such as for gaskets, seals and trim laminations where high initial tack and high ultimate bond strength is required. It can be used in many applications as an aid to assembly. The polyester carrier provides dimensional stability and superior die cutting properties.

Typical values and properties for this bonding agent (XD-2793) have been found, by performance tests, to be as follows:

| | TYPICAL VALUES | | |
|---|---|---|---|
| | SIDE 1 | SIDE 2 | TEST METHOD |
| PROPERTIES | | | |
| Quick Tack, Lbs/Tn Stainless Steel | 17.4 | 14.6 | MACtacCTM-25 |
| Peel Adhesion, Lbs/Tn Stainless Steel-30 min. | 15.0 | 15.4 | PSTC-3 |
| Hi Temp Shear, Hrs. to Fail Stainless Steel-2 psi @ 180 F. | 24 | 20 | PSTC-7 |
| Tensile, Lbs/Tn (N/a) | | | ASTM D-882 |
| MD | | 10 | |
| CD | | 10 | |
| ELONGATION, % | | | ASTM D-882 |
| MD | | 100 | |
| Thickness, Inches Carrier plus adhesive | | .0058 | |
| Temperature Ranges | | | |
| Application: | | | 40 F. to 150 F. (4 C. to 66 C.) |
| End Use: | | | 0 F. to 150 F. (−18 C. to 66 C.) |
| Chemical Resistance | | | |
| Resistant to water, detergent and alcohol. Not recommended for use in contact with aliphatic or aromatic hydrocarbons. | | | |
| SHELF LIFE | | | |
| Two years when stored at 75 F. (24 C.) and 50% relative humidity or less. | | | |

Meanwhile, it is preferable to provide some extra length in the seal 10, for the purpose of allowing a portion of the strip to extend outside the trunk or other opening.

Figure 3:
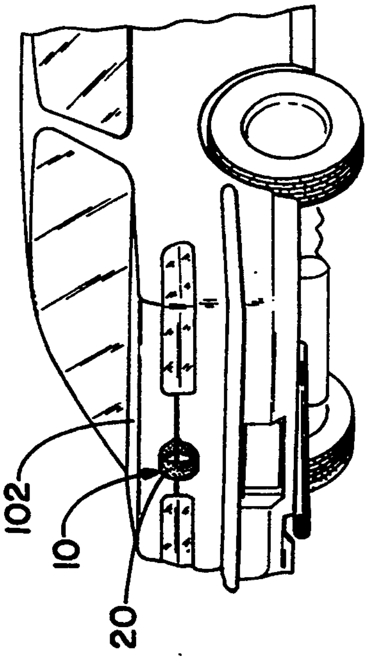
FIG. 3 is a rear elevation of a motor vehicle showing the middle portion of the seal extending exteriorly of the closed trunk lid of the vehicle; and, FIG. 4 is another side elevation of a motor vehicle to indicate use of the seal for securing the hood, windows and doors of the motor vehicle.
Figure 4:
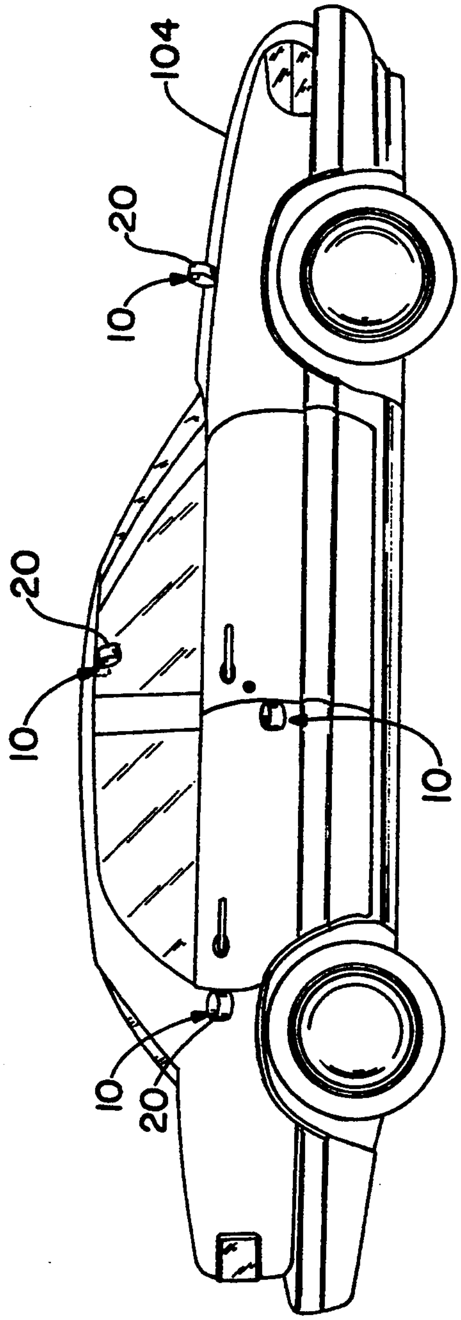

Referring to FIG. 3 and FIG. 4, the outward extending part 20 of the strip serves as a means for visually observing integrity of the seal from the outside of the opening; or, for the intended primary use described here, from the outside of the vehicle. A constant visual observation of the seal is required to ensure its integrity; also, to serve as a means for documenting dates and times of inspection, name of the inspector, etc. The elongated middle portion of strip which extends outside the opening may be formed as a curled, ribboned, or flattened section, whereby the seal essentially curves upon itself and back into the opening.

Since the security seal should effectively serve as a warning to those who may attempt to pilfer from the trunks or other compartments of new vehicles, the strip is preferably provided a fluorescent color. Further, the strip preferably includes indicia (not shown) on or near the middle portion of the strip which extends outside the opening; the indicia enabling documentation thereon of the dates and times of an inspection.

While paper may be the preferable material for the security seal, it should be understood that the seal could also be made from any other suitable material such as a plastic strip, or the like. Further, it should be understood that the strip may have the pressure sensitive coating on opposite sides at opposite ends for a situation where that would make attachment easier or more convenient.

The terms and expressions herein have been used for description and not limitation, and there is no intent in the use of such terms and expressions to exclude any equivalents of any of the features shown or described or portions thereof. And it will be understood that various changes may be made in the form, details, arrangement and proportions of the parts without departing from the spirit and scope of the invention claimed.

We claim:

1. In combination, a portal comprising a first and a second member, said first and second members interacting to provide an open portal when the members are in a separated relationship and to provide a closed portal with a gap between the members when the members are in a proximate relationship, each said member having an inner surface that is exposed only when the members are in the separated relationship and an outer surface that is exposed regardless of whether the members are in the separated or proximate relationship, and a device for providing a tamper-evident seal for the portal, said device comprising:

a strip of material having two ends provided with a means securing the first said end on the interior surface of the first member and the second said end on the interior surface of the second member, a middle portion between the ends lacking said means for securing, and two sides;

wherein the middle portion is sufficiently long to extend outwardly through the gap to allow visual observation thereof; and wherein the middle portion has a transverse weakened portion that will preferentially tear or break prior to the securing means dislodging from either of the interior surfaces.

2. The device of claim 1, wherein the means for securing comprises a band of pressure sensitive adhesive material affixed to a side of the strip near each end thereof.

3. The device of claim 1, wherein the means for securing comprises an area of pressure sensitive adhesive applied to a side of the strip near each end thereof.

4. The device of claim 1, wherein said transverse weakened portion is formed by at least one perforation transversely across a width of the strip.

5.The device of claim 4, wherein the pressure sensitive adhesive has a tensile strength and the transverse weakened portion has a tensile strength, and the tensile strength of said pressure sensitive adhesive is greater than a tensile strength of said weakened portion.

6. The device of claim 5, further comprising indicia on said middle portion of the strip which extends outside the gap.

7. The combination of claim 1, wherein the first member of the portal is a trunk lid of an automobile and the second member is a body of the automobile.

* * * * *